June 13, 1967  H. STACKEGARD  3,325,686
RELAY PROTECTIVE MEANS FOR D.C. TRANSMISSION
Filed Nov. 23, 1964
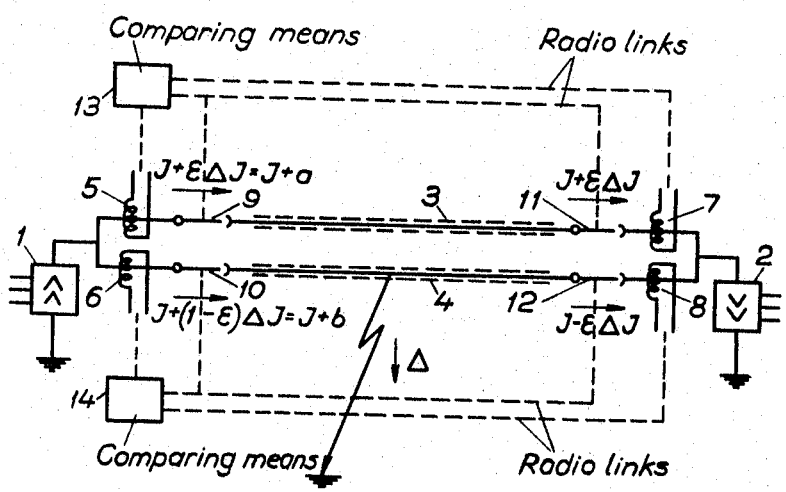
INVENTOR.
HANS STACKEGARD
BY Bailey, Stephens
 Huettig 3,325,686
RELAY PROTECTIVE MEANS FOR D.C.
TRANSMISSION
Hans Stackegard, Ludvika, Sweden, assignor to Allmänna Svenska Elektriska Aktiebolaget, Vasteras, Sweden
Filed Nov. 23, 1964, Ser. No. 413,036
Claims priority, application Sweden, Nov. 30, 1963, 13,291/63
2 Claims. (Cl. 317—28)

The present invention refers to a relay protection means for a D.C. transmission comprising at least two parallel conductors for connecting two converter stations.

In power transmissions with high voltage direct current an earth fault is normally broken by the influence of the earth fault current on the control system of the converter station, so that the transmission voltage is reduced to such a value that the earth fault current is equal to the difference between the current setting in the rectifier and the inverter station, the so-called current margin. Further, the control systems of these converter stations are suitably so arranged that, if the transmission voltage is decreased to a certain low value, all the stations are transferred to inverter operation so that the transmission becomes currentless and the earth fault current is extinguished.

In order to secure the transmission against disturbances, it may be desirable to double the D.C. conductors between the stations. For example there could be two converter stations connected by a sea cable transmission with the earth as return conductor, in which case two parallel cables may be arranged for the one current direction, each of which is able to transmit the normal transmission current. In order to obtain the least possible losses in the transmission both the cables may be used simultaneously as long as no faults occur. In order to make full use of such a double installation, it is desirable when a cable fault occurs first to find out which cable is faulty and secondly to disconnect the faulty cable without breaking the transmission. For this purpose according to the present invention a relay protective means is used comprising selective indicating devices of a type known per se, for example measuring transductors at the ends of the cables, for measuring the cable current and means for comparing the currents at the cable ends. The protection is characterised by switching means at the cable ends of the nature of load interrupters controlled by said selective indicating devices.

Normally it is not possible to break earth fault currents with the help of isolating switches. In the case in question the operation when a fault occurs will however be as follows. The indicating device senses the fault and sends an opening signal to the load interruptors at the end of the faulty conductor. Upon the opening of the interrupters, the resistance in the conductor increases, and the load current in the transmission commutates over to the faultless conductor. At the same time the earth fault current is divided between both the opened interrupters. The control system of the converter stations reduces the direct voltage of the transmission in order to limit the sum of the transmission current and the faulty current to the predetermined value. If this voltage decrease is not sufficient to extinguish the faulty current with fully open interrupters, measures should be taken to decrease the voltage further so that the interrupters and thereby the fault become currentless.

The invention will be more closely described with reference to the accompanying drawing, which shows two converter stations connected with the help of two parallel cables.

The drawing shows two converter stations 1 and 2 connected by two parallel D.C. cables 3 and 4 and with earth return. At the ends of both the cables 3 and 4, measuring transductors 5–8 are arranged for measuring the current at the ends of the cables. By a transmission link, for example a radio link, the measured result is transmitted from the one station to the other, so that it becomes possible to compare all four measured results in one station by means of comparing devices 13 and 14.

If the current values at both ends of one cable become different, this means that a fault has occurred, and an order is given for disconnection of this cable. For this reason load interrupters 9–12 are arranged at both ends of the cables. These interrupters are of the same type as are used in by-pass connecting of constituent converters in a converter station, which means that upon opening an electric arc with great resistance arises in the interrupters. In the case of a fault in the cable 4 as shown on the drawing, the interrupters 10 and 12 are opened by an order from the current comparing devices 6, 8, 14, so that the resistance in this current path increases and the load current commutates from the cable 4 over to the cable 3.

As stated previously, it is usual in power transmissions of this type that the control of the converter stations is so arranged that the current increase because of an earth fault causes a decrease in the transmission voltage to such a low level that the fault current does not exceed the so-called current margin. In the case of smaller earth faults with relatively high resistance, the operation of a conventional transmission may continue with decreased voltage, while in the case of larger earth faults the rectifier station is transferred to inverter operation, so that the line quickly becomes voltageless. The present invention gives the advantage that even smaller earth faults immediately cause disconnection of the faulty cable, while the faultless cable continues to operate undisturbed, so that the transmission voltage is quickly increased to its normal value when the faulty cable is disconnected. In order to secure the breaking of earth fault currents even at when larger faults occur, measures should be taken for continued decreasing of the voltage if one of the interrupters 10 and 12 is still conducting when they have been fully opened. For this reason the control of the converter stations when a fault occurs is suitably controlled by the output signals given by the transductors 6 and 8, which will be zero when the earth fault current has been broken.

In order to determine the position of the earth fault, the protective means should suitably comprise a device known per se for measuring the current distribution over the two parallel conductors when an earth fault occurs. If, for example, the earth fault current referred to on the drawing is of the size $\Delta I$, and the normal current in both the parallel conductors 3 and 4 is I, this earth current will cause a current distribution as indicated in the drawing, when the station 1 operates as a rectifier and the station 2 as an inverter. In the conductor 3 the current therefore becomes $I+\epsilon\Delta I$, while in the conductor 4 the current on one side of the fault becomes $I+(1-\epsilon)\cdot\Delta I$ and on the other side of the earth fault $I-\epsilon\cdot\Delta I$. As a matter of fact the transductor 5 will show a current $I+a$, while the transductor 6 gives a current value of $I+b$, by means of which it can be calculated that the value of $\epsilon$ will be proportional to $a/a+b$. With the help of this value and the resistance values for the two parallel conductors, the position of the earth fault can be estimated in a known way. In the example shown, similar current distribution has been provided in the two conductors 3 and 4, which provides similar resistance in these conductors. Often however a certain difference between the said resistances must be taken into account, but this only gives rise to a constant divergence in the current distribution which can be measured beforehand and taken into account when calculating the value of $\epsilon$.

I claim:

1. In a D.C. transmission line between two stations, said transmission line comprising at least two parallel conductors, relay protection means for said transmission line, said protection means comprising isolating switches at the ends of said conductors and selective fault indicating means for said conductors, said selective fault indicating means comprising for each conductor current measuring means at the ends of said conductor and comparing means for said two current measuring means of each conductor, said comparing means including means responsive to a certain difference between the signals from said current measuring means of the same conductor to give an output signal, and means responsive to such output signal to open said isolating switches.

2. Relay protection means as claimed in claim 1, said selective fault indicating means comprising calculating means including distance calculating means for comparing the different current values at the ends of a faulty conductor.

References Cited

UNITED STATES PATENTS 2,462,179   2/1949   Goldsborough _____ 317—29
3,234,397   2/1966   Park.

MILTON O. HIRSHFIELD, *Primary Examiner.*

J. D. TRAMMMELL, *Assistant Examiner.*